United States Patent [19]
McCracken

[11] 3,905,675
[45] Sept. 16, 1975

[54] OPTICAL SYSTEMS HAVING STOP MEANS FOR PREVENTING PASSAGE OF BOUNDARY WAVE RADIATION

[75] Inventor: William Lynn McCracken, Wayland, Mass.

[73] Assignee: Honeywell Inc., Minneapolis, Minn.

[22] Filed: Feb. 15, 1973

[21] Appl. No.: 322,839

[52] U.S. Cl. .................... 350/17; 350/54; 350/55; 350/205; 350/207
[51] Int. Cl. .......................................... G02b 27/00
[58] Field of Search...... 350/17, 45, 54, 55, 175 TS, 350/205, 206, 207, 208

[56] References Cited
UNITED STATES PATENTS

| | | | |
|---|---|---|---|
| 1,578,899 | 3/1926 | Lohmann | 350/55 |
| 2,838,601 | 6/1958 | Cavanagh et al. | 350/206 X |
| 3,476,457 | 11/1969 | Nomarski | 350/17 |
| 3,648,056 | 3/1972 | Buttweiler et al. | 350/276 SL UX |

*Primary Examiner*—John K. Corbin
*Attorney, Agent, or Firm*—C. J. Ungemach; Albin Medved; John S. Munday

[57] ABSTRACT

An improvement in optical instruments for observing a weak source of electromagnetic energy near an intense source of such energy. The improvement comprises the provision of stop members having apertures, the members being located and the apertures being sized to block the passage of off-axis radiation, and independently to block the passage of boundary wave radiation inherently produced by input components of the instrument.

9 Claims, 8 Drawing Figures

OPTICAL SYSTEMS HAVING STOP MEANS FOR PREVENTING PASSAGE OF BOUNDARY WAVE RADIATION

BACKGROUND OF THE INVENTION

This invention relates to the field of instruments responsive to electromagnetic radiation in the frequency band conveniently referred to as "optical." The need arises from time to time for photographing, measuring, or otherwise observing a first source of radiation of low intensity located in close proximity to a second source of such radiation which is of higher intensity. An example is the problem of optically observing the temperature of the earth's atmosphere from a satellite by the use of infra-red technology: the close proximity of the earth itself as a large source of much greater intensity, because of its higher temperature, results in partial or total masking of the desired, "on-axis" radiation from the atmosphere by unwanted "off-axis" radiation from the adjacent planetary body. The off-axis radiation not only enters and passes through the optical system in accordance with known principles of geometric optics, but is also diffracted to appear in the optical system in the form of "boundary wave" radiation which may be several times as intense as the on-axis radiation to be observed.

Hereinafter "boundary wave radiation" will refer to such radiation diffracted from off-axis sources. Boundary wave radiation from on-axis sources may always be disregarded, and for ordinary applications boundary wave radiation from off-axis sources is of negligible significance, but when an on-axis source of interest is weak and there is an intense off-axis source, the boundary wave radiation may become not merely significant but even dominant to the point that the desired observations are unobtainable.

I have discovered that stops having apertures of suitable size, suitably positioned along the optical axis of an instrument, can reduce the masking effect of off-axis and boundary wave radiation by many orders of magnitude. The improvement in fact reaches the point where "scattered" energy—due to scratches and imperfections in optical elements, to dust particles, and so on—becomes the principal source of masking radiation. Techniques for minimizing the scattering of radiation are well known in the art and will not be specifically discussed here.

It is accordingly a principal object of my invention to improve optical instruments by substantially preventing off-axis and boundary wave radiation from passing through the instrument.

A more specific object of my invention is to provide a set of aperture stops, in an optical instrument, so sized and positioned as to minimize transmission of off-axis and boundary wave radiation through the instrument.

Another object of my invention is to provide a new method for minimizing the masking effect in an optical instrument of off-axis and boundary wave radiation.

Various other objects, advantages, and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

DESCRIPTION OF THE DRAWING

In the drawing,

Turning now to FIGS. 1–3, a dioptric optical instrument is shown to comprise a housing 10 and to have an optical axis 11 extending from an initial aperture 12 to a radiant energy detector or transducer 13. The active elements of the system are shown to comprise primary or objective lens means 14 and relay lens means 15, both mounted in housing 10. Incident radiation from a source within a field of view of say 15 milliradians about axis 11 is focused by lens means 14 at a first image plane, which intersects the axis at a point 17. Lens means 15 focuses radiation from the first image plane at a second image plane which intersects axis 11 at point 20, where detector 13 is located.

Figure 1:
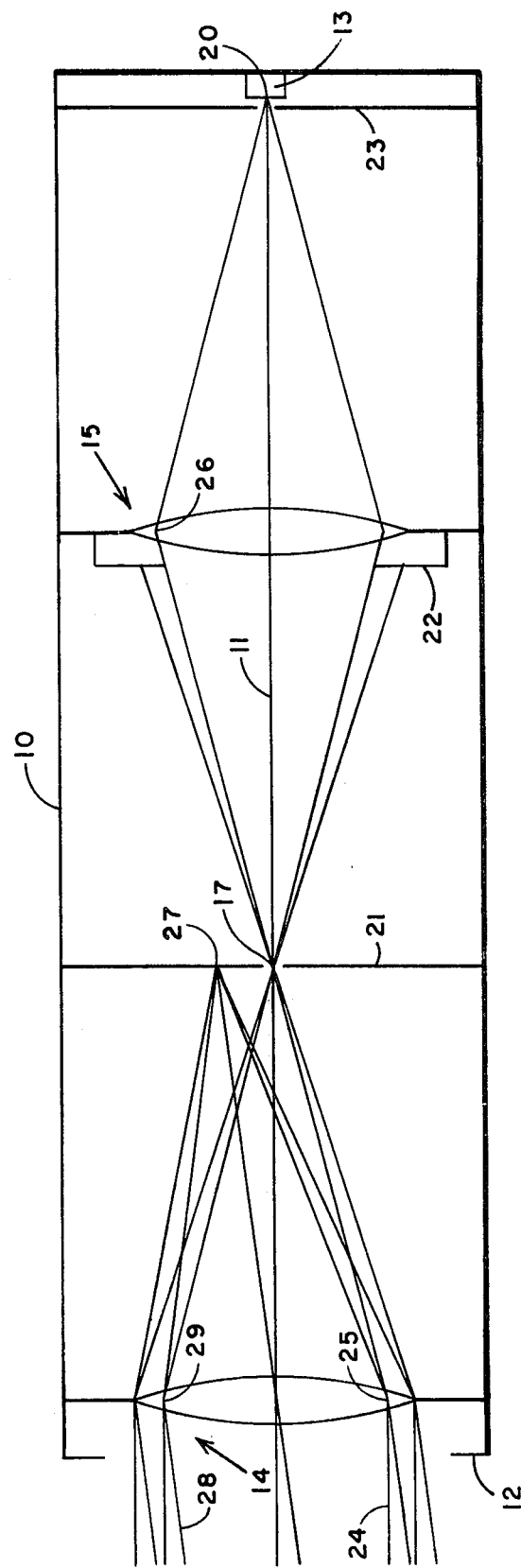
FIG. 1 is a schematic showing of a dioptric optical instrument according to the invention, tracing the paths of on-axis or "signal" and off-axis or "noise" radiation therein.

While simple double-convex lenses are shown at 14 and 15 in the drawing, it is to be understood that doublets or even more complex lens structures may be used according to the needs of the instrument. It will also be apparent that the refractive materials in lens means 14 and 15, and the material of detector 13, must be chosen with the wavelength of the radiation of interest in mind. For convenience the present disclosure applies particularly to radiant energy in the infra-red band of wavelengths: the refractive material may be "IRTRAN" and the detector may be indium antimonide for this application.

The improvement which constitutes the invention here comprises a plurality of stop members 21, 22, and 23 mounted in housing 10. Stop member 21 is shown to have a small axial aperture surrounding point 17. This aperture may be referred to as an oversized field stop because its diameter is slightly greater than the true geometrical field of view imaged in the focal plane at 17.

Stop member 22 is shown to have a large axial aperture, which is slightly smaller than the cross section at the stop, of the beam radiating from the aperture in stop member 21. In practice member 22 may be located on either side of lens means 15, or even between its elements if the lens structure is complex. Alternatively it is possible to merely reduce the diameter of the optical element itself: although this is a less desirable expedient I use the expression "stop member" in this connection broadly enough to encompass such an equivalent.

Stop member 23 is also an oversized field stop, and is shown to have a small axial aperture and to be adjacent to point 20. While the stop members are shown as essentially plane, they may be given more complex light-trapping configurations if desired. The stop members and the inside surfaces of housing 10 are coated with radiation absorbing paint.

The path of a ray of on-axis radiation may be traced in FIG. 1 through points 24, 25, 17, 26, and 20. Since the diameter of the aperture in stop member 21 is only slightly larger than that of the field of lens means 14 at the first image plane, radiation having any significant component of direction normal to axis 11 falls on stop member 21 at some point 27 displaced from point 17, and is ultimately absorbed by the coating on member 20 and housing 10. The path of a ray of such off-axis radiation may be traced in FIG. 1 through points 28, 29, and 27.

The radiation falling on lens means 14 at its edge is diffracted towards the axis as "boundary wave" radiation. Boundary wave theory is discussed in "Principals of Optics" by Born and Wolf (Pergamon Press, 1st edition, 1959) beginning at page 448. See also the discussion by A. Rubinowicz in "Progress in Optics," Vol. IV, E. Wolf editor, American Elsevier Publishing Co., Inc., New York, New York, 1965. As they are explained, boundary wave energy may be considered as radiating from an annular source defined by the edge of the lens means. This radiation may be considered independently of the on-axis radiation shown in FIG. 1. If the off-axis source is many times brighter than the on-axis source, the boundary wave radiation is correspondingly more intense.

Figure 2:
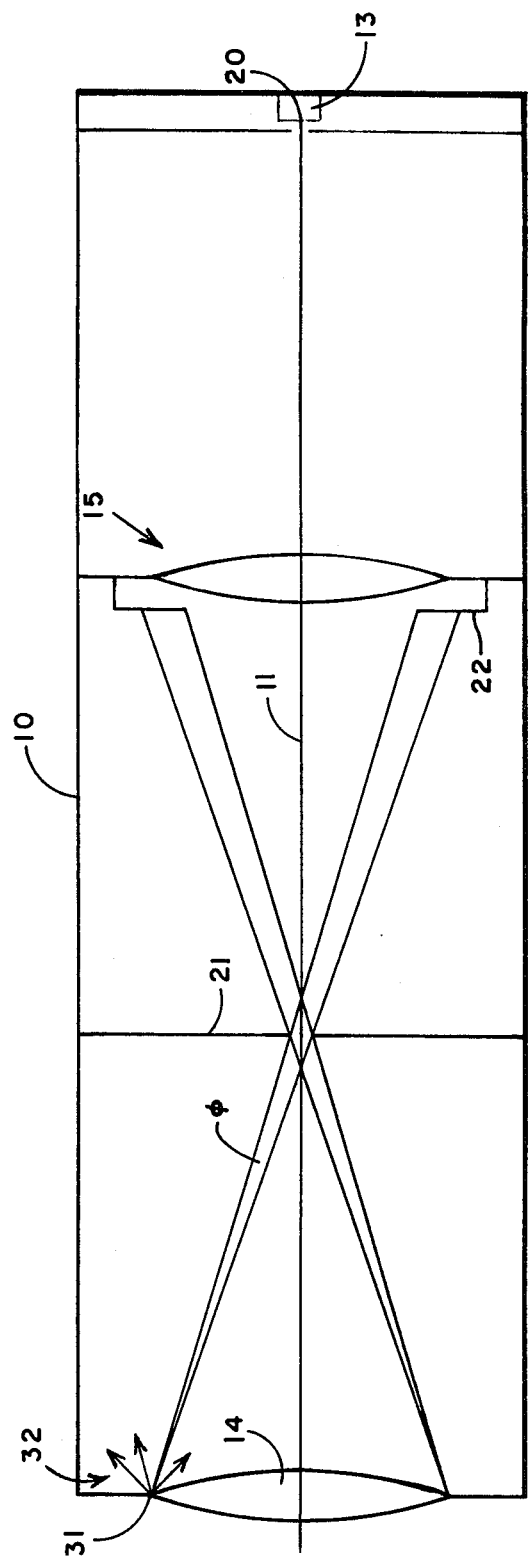
FIG. 2 is a showing like FIG. 1, tracing the path in the instrument of boundary wave radiation originating at or near an initial aperture of the system.

For the application of these principals to my invention, refer now to FIG. 2. Radiation from each point of the annular source defined above propagates in all directions. The rim of the lens means in FIG. 2 comprises such a source, and radiation from each point thereon, such as point 31, propagates in all directions as indicated by the arrows 32. A major portion of this radiation is intercepted by housing 10 and stop means 21, but the radiation contained within the solid angle $\phi$ defined at the point 31 by the aperture in stop member 21 may pass through the aperture, and of this a portion would fall on lens member 15 and be redirected toward detector 13. It is the function of stop member 22 to prevent this: the aperture in this member is sufficiently small that the transmitted boundary wave radiation is intercepted by it, for reflection and absorption. As is suggested in FIG. 1 this also results in blocking a certain amount of the on-axis radiation, that which would pass through the annulus outside of points 24, 27 of the entrance aperture in FIG. 1, and the system must be designed with this decrement in mind for critical applications.

Figure 3:
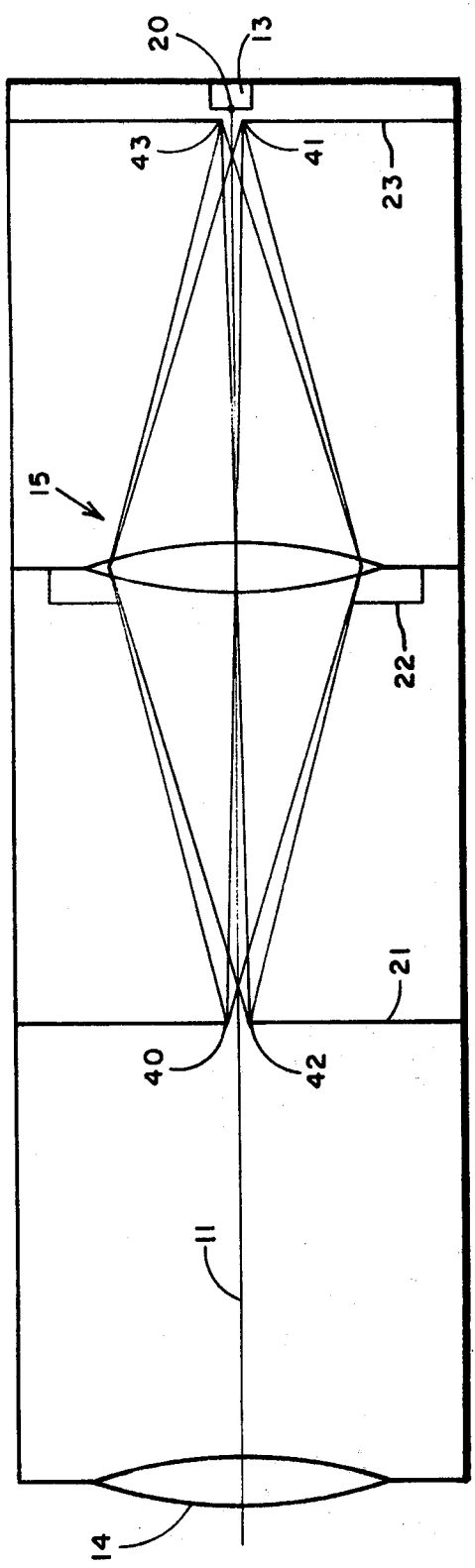
FIG. 3 is a showing like FIG. 1, tracing the path in the instrument of boundary wave radiation originating at an aperture within the system.

Just as an annular pseudo-source of radiation surrounds the active portion of lens means 14, so a similar annular pseudo-source of radiation surrounds the aperture in stop member 21 because of the boundary wave energy falling upon it. Only a small portion of the boundary wave radiation from the first annular source could pass through the aperture in member 21, but almost all of that from the second annular source can reach lens means 15, for redirection toward detector 13. Stop member 23, however, is located very close to the detector, and its aperture is of substantially the same size as the field of lens means 15 for on-axis radiation. Accordingly, as is shown in FIG. 3, most of the unwanted radiation falls on the third stop member, for reflection and absorption. Thus radiation from point 40 is focused at point 41, that from point 42 at point 43, and so on.

The radiation from the second annular source is several orders of magnitude less intense than that from the first annular source, because the on-axis radiation does not touch the aperture at all, and only a small portion of the first boundary wave energy falls there. A further attenuation of several orders of magnitude in the unwanted radiation is accomplished by the use of aperture stop 23, so that an on-axis object can usefully be observed even if it is in the close neighborhood of an off-axis source hundreds of times as intense.

Figure 4:
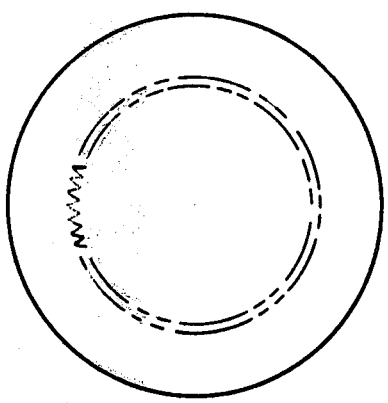
FIG. 4 shows how an aperture may be apodized to reduce the effect of its boundary wave radiation at the axis of the system.

Further improvement can be accomplished by apodizing one or more of the apertures, as suggested by FIG. 4. By this means a circular edge, which diffracts radiation in a direction normal thereto and hence towards the axis, is replaced by a plurality of nearly radial edges, which diffract radiation away from the axis. The most effective position for an apodized aperture in an association with objective lens means 14, and my invention contemplates provision of such an apodized aperture at that location if desired. The aperture in stop member 22 likewise can be apodized: the apertures in stop members 21 and 23 are so small that apodizing is not practically applicable here.

My invention has been described above as applied in a dioptric instrument, since it is perhaps most easily explained in such an embodiment. As a practical matter, however, the invention is also useful with catoptric instruments, and for completeness a second embodiment of the invention in an instrument of this type is shown in FIGS. 5–8, to which reference should now be made.

The catoptric instrument includes a housing 110 which encloses a plurality of optical elements in the form of reflectors arranged along an optical axis 111 which extends between entrance aperture 112 and a point 120 on a radiant energy detector 113. The primary or objective element is a reflector 114, and comprises an off-axis portion, conveniently circular, of a parabolic mirror. The instrument further includes relay optics 115 in the form of a pair of further reflectors 118 and 119. Reflector 118 also comprises an off-axis portion of a parabolic mirror, and is arranged to be confocal with reflector 114 at a point 117 at which optical axis 111 intersects the focal surfaces of reflector 114 and reflector 118. Paraxial light entering aperture 112 is reflected from reflector 114 to reflector 118, coming to a focus between them: it proceeds as a parallel beam to reflector 119, another off-axis portion of a parabolic mirror, which focuses the beam at detector 113.

A first stop member 121 is located between reflectors 114 and 118 and is provided with a small axial aperture. A second stop member 122 having a large aperture forms a portion of relay optics 115 and is located near reflector 119. A third stop member 123 having a small axial aperture is located between reflector 119 and detector 113 and preferably close to the later.

Figure 6:
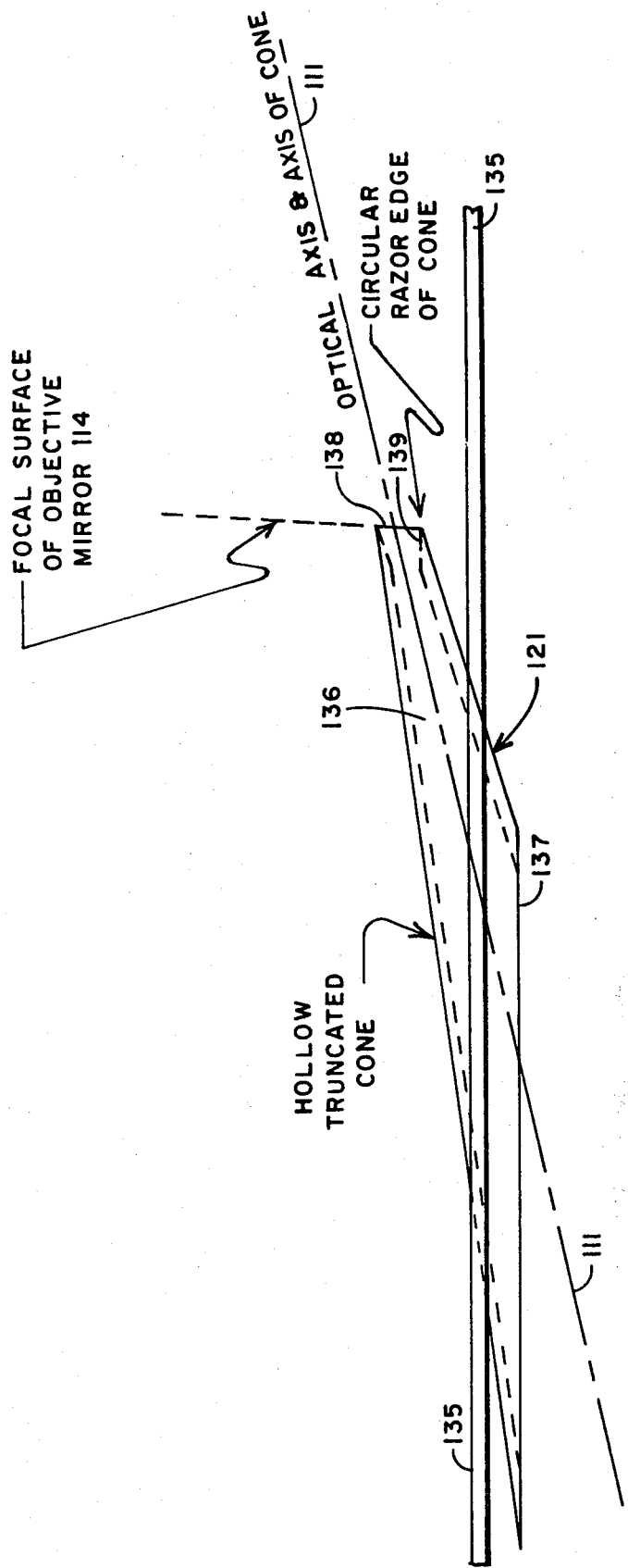
FIG. 6 gives details of a specialized aperture for use in the instrument of FIG. 5.

Housing 110 is divided into upper and lower chambers by a central partition 135. This arrangement requires that stop member 121 be of special construction, which is shown in FIG. 6 to comprise a hollow right circular cone 136, coaxial with optical axis 11 where it passes through partition 135, and truncated at 137 and 138. The former truncation is generally parallel to the surface of partition 135: the latter coincides with the focal surface of reflector 114, and is internally beveled as at 139 to a knife edge. The surfaces of partition 135 and stops 121, 122, and 123 are coated with radiation absorbent material, as is the inner surface of housing 10.

Figure 5:
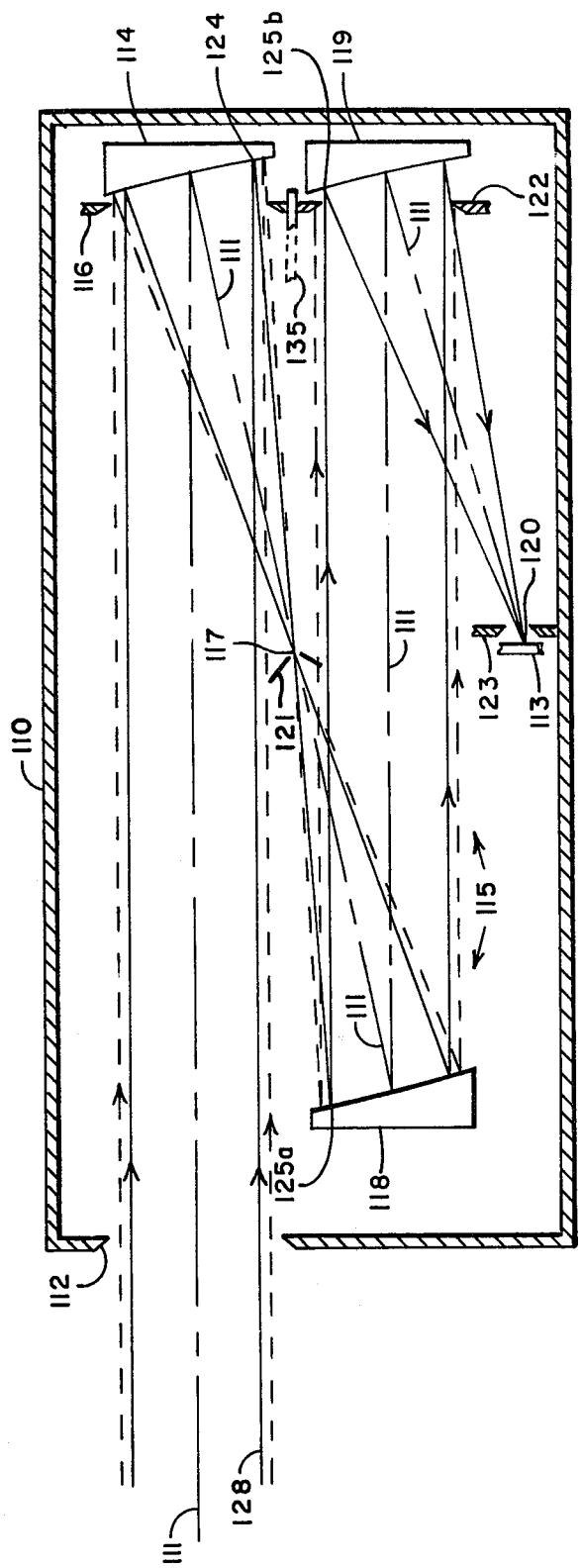
FIG. 5 is a schematic showing of a catoptric optical instrument according to the invention, tracing the path of on-axis radiation therein.
Figure 7:
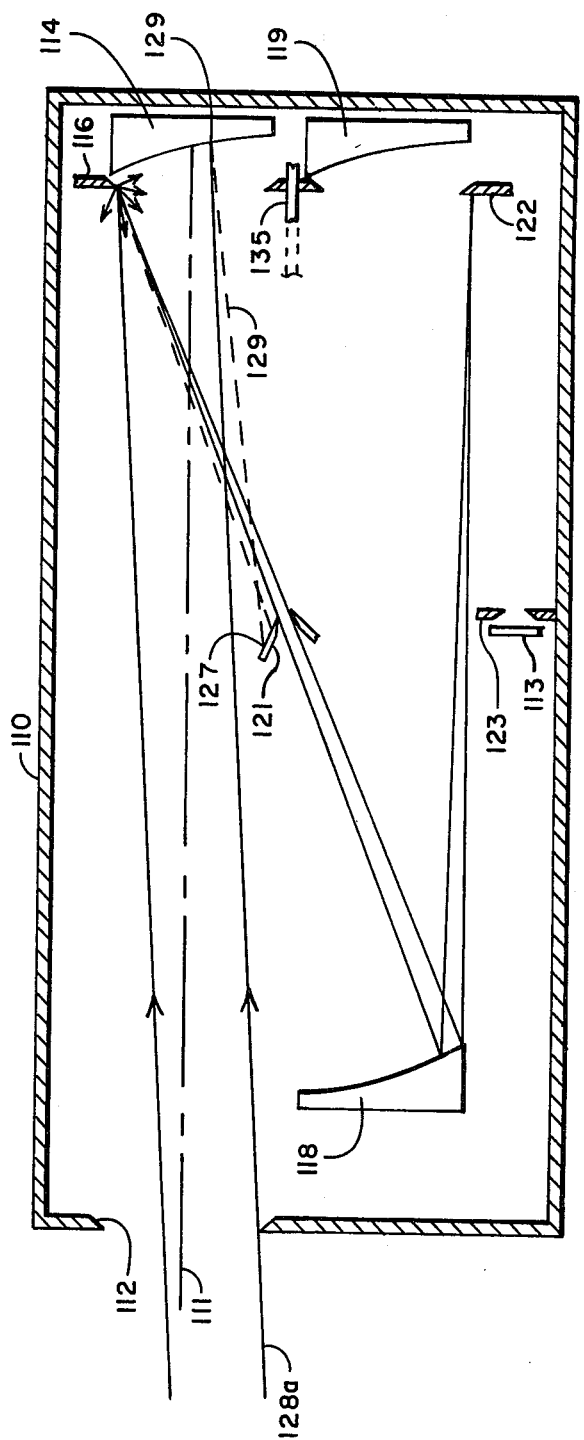
FIG. 7 is a showing like FIG. 5, tracing the paths in the instrument of off-axis radiation and of boundary wave radiation originating at or near an initial aperture of the system.
Figure 8:
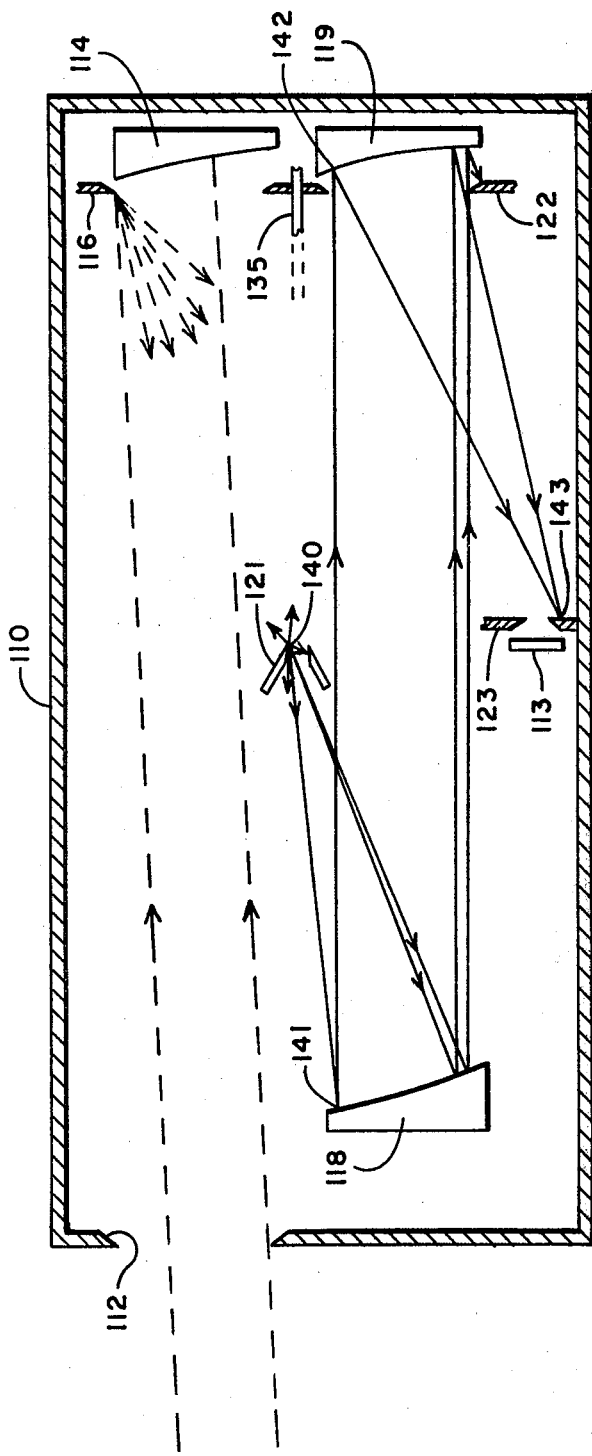
FIG. 8 is a showing like FIG. 5 tracing the path in the instrument of boundary wave radiation originating at an aperture within the system.

A ray of on-axis radiation may be traced in FIG. 5 through points 128, 124, 117, 125a, 125b, and 120. To avoid confusion FIG. 7 shows separately the path of boundary wave radiation passing through aperture stop 112, to pass through points 128a, 129, and 127, the later on the outer surface of stop member 121 so that as before off-axis radiation is prevented from passing through the instrument. Stop member 116 may be apodized if desired. Similarly FIG. 8 shows separately the path of boundary wave radiation originating at stop member 121 to follow a path such as 140, 141, 142, and 143 and thus be screened from detector 113 by stop member 123.

From the foregoing it will be evident that I have invented a new method of reducing the effect of off-axis and boundary wave radiation in an optical system by combining a number of optical expedients in interdependent fashion, so that both off-axis radiation and boundary wave radiation are suppressed without undue attenuation of the desired on-axis radiation.

Numerous objects and advantages of my invention have set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim as my invention:

1. In an optical instrument having an optical axis to be directed toward an object to be observed, in combination:

objective optics coaxial with said optical axis and focusing at a first image plane along said axis incident electromagnetic radiation aligned therewith, said optics including means inherently acting as a first annular source of boundary wave radiation;

relay optics coaxial with said optical axis and focusing radiation from said first image plane at a second image plane along said axis;

first stop means located at said first image plane and having an over-sized axial aperture to permit passage of on-axis incident radiation while preventing passage of radiation having a significant component of direction normal to said axis, said over-sized axial aperture having a diameter slightly greater than the true geometric field of view imaged in the focal plane, said aperture inherently acting as a second source of boundary wave radiation;

second stop means in said relay optics having an axial aperture sized to effectively reduce the size of the second objective optics to permit passage of said on-axis incident radiation while preventing passage of boundary wave radiation from said second source; and third stop means located adjacent said second image plane having an axial aperture over sized to prevent passage of boundary wave radiation having a significant component of direction normal to said axis, said over-sized aperture having a diameter slightly greater than the true geometric field of view imaged in said second image plane.

2. Apparatus according to claim 1, wherein said second stop means is apodized.

3. Apparatus according to claim 1 in which said objective optics are dioptric.

4. Apparatus according to claim 1, in which said relay optics are dioptric.

5. Apparatus according to claim 1 in which both said optics are dioptric.

6. Apparatus according to claim 1 in which said objective optics are catoptric.

7. Apparatus according to claim 1 in which said relay optics are catoptric.

8. Apparatus according to claim 1 in which both said optics are catoptric.

9. Apparatus according to claim 1 together with radiation responsive means mounted at said second image plane.

* * * * *